(12) United States Patent
Tschofenig et al.

(10) Patent No.: US 10,924,475 B2
(45) Date of Patent: *Feb. 16, 2021

(54) MANAGEMENT OF RELATIONSHIPS BETWEEN A DEVICE AND A SERVICE PROVIDER

(71) Applicants: ARM IP Limited, Cambridge (GB); ARM Limited, Cambridge (GB)

(72) Inventors: Hannes Tschofenig, Tirol (AT); Remy Pottier, Grenoble (FR)

(73) Assignees: ARM LIMITED, Cambridge (GB); ARM IP LIMITED, Cambridge (GB)

( * ) Notice: Subject to any disclaimer, the term of this patent is extended or adjusted under 35 U.S.C. 154(b) by 25 days.

This patent is subject to a terminal disclaimer.

(21) Appl. No.: 15/536,518

(22) PCT Filed: Nov. 30, 2015

(86) PCT No.: PCT/GB2015/053649
§ 371 (c)(1),
(2) Date: Jun. 15, 2017

(87) PCT Pub. No.: WO2016/097685
PCT Pub. Date: Jun. 23, 2016

(65) Prior Publication Data
US 2017/0359338 A1 Dec. 14, 2017

(30) Foreign Application Priority Data
Dec. 17, 2014 (GB) ..................................... 1422501

(51) Int. Cl.
*H04L 29/06* (2006.01)
*G06F 21/34* (2013.01)
(Continued)

(52) U.S. Cl.
CPC .......... *H04L 63/0853* (2013.01); *G06F 21/34* (2013.01); *G06F 21/44* (2013.01); *G06F 21/6272* (2013.01)

(58) Field of Classification Search
CPC ....... H04L 63/0853; G06F 21/34; G06F 21/44
See application file for complete search history.

(56) References Cited

U.S. PATENT DOCUMENTS 9,729,515 B1 * 8/2017 Anantharaju ........... H04L 63/04
2005/0054329 A1 3/2005 Kokudo
(Continued)

FOREIGN PATENT DOCUMENTS

| EP | 2817919 | 12/2014 |
| EP | 2819446 | 12/2014 |

(Continued)

OTHER PUBLICATIONS

Further Search Report for GB1422501.5, dated Dec. 18, 2015, 4 pages.
(Continued)

*Primary Examiner* — Ellen Tran
(74) *Attorney, Agent, or Firm* — Nixon & Vanderhye, P.C.

(57) ABSTRACT

An authentication device is used to create a secure connection between an Internet of Things (IoT) device and a service provider, so that the IoT device is not limited to only the services of one specific provider or the specific services of the provider of the IoT device. In addition, multiple IoT devices purchased from several different providers can all be connected to the same service provider.

22 Claims, 7 Drawing Sheets

(51) Int. Cl.
*G06F 21/62* (2013.01)
*G06F 21/44* (2013.01)

(56) References Cited

U.S. PATENT DOCUMENTS

| | | | |
|---|---|---|---|
| 2005/0216747 A1* | 9/2005 | Yeap | H04L 63/0853 713/185 |
| 2008/0235511 A1* | 9/2008 | O'Brien | H04L 9/0844 713/171 |
| 2009/0287922 A1* | 11/2009 | Herwono | H04L 9/0822 713/155 |
| 2010/0304716 A1* | 12/2010 | Hoeksel | H04W 4/70 455/411 |
| 2011/0125925 A1* | 5/2011 | Bouthemy | H04L 12/2834 709/250 |
| 2012/0162538 A1* | 6/2012 | Dixon | H04L 12/2814 348/734 |
| 2013/0081113 A1* | 3/2013 | Cherian | H04W 4/70 726/4 |
| 2013/0212233 A1 | 8/2013 | Landry | |
| 2013/0212236 A1* | 8/2013 | Foti | H04W 4/70 709/221 |
| 2013/0223279 A1 | 8/2013 | Tinnakornsrisuphap et al. | |
| 2013/0340059 A1 | 12/2013 | Christopher et al. | |
| 2014/0171027 A1 | 6/2014 | Arkko et al. | |
| 2014/0328334 A1 | 11/2014 | Viswanathan et al. | |
| 2015/0071139 A1* | 3/2015 | Nix | H04W 4/70 370/311 |
| 2015/0095648 A1* | 4/2015 | Nix | H04W 4/70 713/170 |
| 2016/0294819 A1* | 10/2016 | Salmela | H04W 12/04031 |

FOREIGN PATENT DOCUMENTS

| | | |
|---|---|---|
| EP | 2936763 | 10/2015 |
| WO | WO 2014/094835 | 6/2014 |
| WO | WO 2015/061678 | 4/2015 |

OTHER PUBLICATIONS

International Search Report and Written Opinion of the ISA for PCT/GB2015/053649, dated Mar. 14, 2016, 11 pages.
Search Report for GB1422501.5, dated Jun. 23, 2015, 7 pages.
Examination Report issued in GB 1422501.5 dated Oct. 1, 2020 (4 pages).

* cited by examiner

MANAGEMENT OF RELATIONSHIPS BETWEEN A DEVICE AND A SERVICE PROVIDER

This application is the U.S. national phase of International Application No. PCT/GB2015/053649 filed 30 Nov. 2015, which designated the U.S. and claims priority to GB Patent Application No. 1422501.5 filed 17 Dec. 2014, the entire contents of each of which are hereby incorporated by reference.

TECHNICAL FIELD

The present subject matter relates generally to apparatus and methods for processing data. More specifically, the apparatus and methods disclosed relate to the management of relationships between a device and a service provider.

BACKGROUND

In recent years, there has been an increase in the numbers of devices within the home, other buildings or the outdoor environment that have processing and communication capabilities which allow them to interact with other processing devices. Everyday objects and relatively small scale processing devices may be connected to each other and to central platforms as part of the Internet of Things (IoT). For example, a sprinkler system in the home may gather information from various moisture sensors and control the activation of sprinklers based on the moisture information. Also, a healthcare provider may use wireless sensors (e.g. a heart rate monitor or a sensor for monitoring that a patient is taking their prescribed medicine) to track the health of patients whilst at home.

In a variety of applications, there may be a central service provider which interacts with one or more IoT devices, the IoT devices providing data to the service provider and/or being controlled by the service provider. The IoT devices may differ considerably in terms of complexity, processing resources, hardware and purpose. It can be important to provide trust between the IoT device and the service provider so that the service provider can trust the validity of the data received from the IoT device and the IoT device can trust any commands received from the service provider.

Today, when an IoT device is purchased from a provider, it is "hardwired" for use with the provider's specific services and the user implicitly consents to data collection and data processing by the service provider by purchasing that device. The IoT device is pre-configured with credentials (such as shared secrets, or certificates) and software provided during manufacturing, for use with only that service provider and uploads data to various servers as pre-programmed by the service provider when activated. Activation of the IoT device, for example turning the IoT device on, connects the IoT device with the services of that provider which then requests the user to register their device to their existing account. For instance, a fitness watch may be purchased from Suunto® and upon activation of the watch, it connects to the Suunto® cloud software (Movescount) and gets associated with the users account. If the user does not already have an account with Suunto® then he first needs to create one, which requires personal data of the user to be entered (such as email address, name, and various health relevant items). This provides the IoT device with software updates and the ability to configure the watch. However, the watch cannot be connected to the services offered by any other provider directly—all data flows have to go through the Suunto® cloud.

BRIEF DESCRIPTION OF THE FIGURES

For a better understanding of the embodiments and as to how the same may be carried into effect reference will now be made, by way of example only, to the accompanying figures in which.

In the figures, like reference numerals refer to the same or similar elements.

Additional advantages and novel features will be set forth in part in the description which follows, and in part will become apparent to those skilled in the art upon examination of the following and the accompanying drawings or may be learned by production or operation of the examples. The advantages of the present teachings may be realised and attained by practice or use of various aspects of the methodologies, instrumentalities and combinations set forth in the detailed examples discussed below.

DETAILED DESCRIPTION

In the following detailed description numerous specific details are set forth by way of examples in order to provide a thorough understanding of the relevant teachings. However, it will be apparent to one of ordinary skill in the art that the present teachings may be practiced without these specific details.

In other instances, well known methods, procedures, components and/or circuitry have been described at a relatively high-level, without detail, in order to avoid unnecessarily obscuring aspects of the present teachings.

Figure 1:
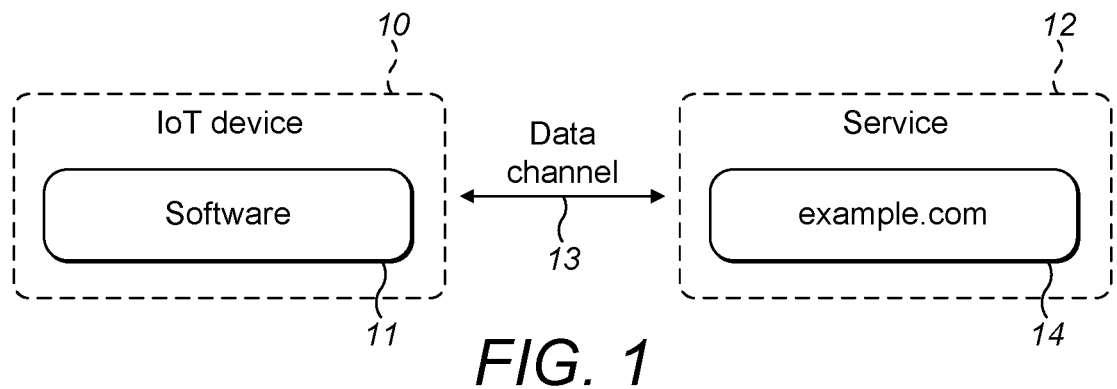
FIG. 1 schematically illustrates an IoT device and a service provider.

FIG. 1 illustrates the relationship between an IoT device and a service provider where the user purchases the IoT device from the service provider such that the IoT device can only be used with the services of the service provider. As can be seen in FIG. 1, the IoT device 10 has software 11 pre-provisioned on IoT device 10 so that the IoT device 10 is only capable of working with the service provider 12. The software running on the IoT device 10 interacts with the remote service provider 12 to upload data (in one example temperature readings). The data is transferred between the IoT device 10 and the service provider 12 via the data channel 13. The users utilises the website 14 (example.com) of the service provider 12 to manage indirectly their IoT device 10. In one example, a user is initially required to register with the service provider 12 and create an account (if they do not already have one) which normally requires a "username" and a "password". The user then associates the IoT device 10 with the account, usually by entering the serial number provided on the IoT device 10 to the website 14. The users "username" and "password" are then linked with the specific IoT device 10. The user is subsequently required to enter their "username" and "password" into the website 14 before access to their IoT device 10 is granted, such that the user can only interact indirectly with their IoT device via the service provider's website 14. For example, if the user wants to issue commands to the IoT device, they issue these commands to the service provider's website 14 and then the service provider will issue the commands to the IoT device.

However, a user may want to select one or more service providers which the IoT device is to be associated with, so that an IoT device is not limited to only the services of one specific provider or the specific services of the provider of the IoT device. In addition, a user may want to associate multiple IoT devices purchased from several different providers to the same service provider. Furthermore, a user may want to directly control their IoT device.

An Internet of Things (IoT) device described in further detail below, also referred to as an agent device, is considered to be "blank" when initially purchased and unboxed. This means that the IoT device is provided without any links to a specific service provider, also referred to as a resource, where the resource is obtained via a URL through the Internet. For example, the IoT device does not contain any pre-configured security credentials or any service provider specific software and does not have application code running, although an operating system is present (similar to a browser that has a JavaScript™ run-time installed but the actual "application code" is downloaded in the form of JavaScript™). In addition, the IoT device is provided without any links to a specific authentication device (described in detail below).

However, the IoT device does include communication technology which enables the IoT device to interact with a nearby authentication device. In one embodiment, the communication technology used may be a wireless communication, such as communication using wireless local area network (WiFi), short range communication such as radio frequency communication (RFID) or near field communication (NFC), or communications used in wireless sensor networks such as Zigbee or Bluetooth or 6LoWPAN. In another embodiment, the communication technology used may be a cellular network such as 3G or 4G. In another embodiment, the communication technology used may be a wired communication such as using a fibre optic or metal cable. The IoT device could also use two or more different forms of communication technology, such as several of the examples given above in combination, and there is no requirement for the IoT device to use the same technology for communication with the authentication device and for communication with the service provider. In addition, the IoT devices contain information about what it is and what capabilities it has and any available sensors (for example: Manufacturer "Nespresso™", Device Name "PIXIE Electric Lime", Device Type "Coffee Machine").

The manufacturer of the IoT devices described below may provide software for use with the IoT devices, however third parties may also provide software for use with the IoT devices. The IoT device obtains the software from the service provider following activation of the IoT device and selection of the resource. The IoT device may be associated with and have software for more than one service provider.

In addition, the IoT devices may "talk" to various different service providers, such as cloud service providers.

Figure 2:
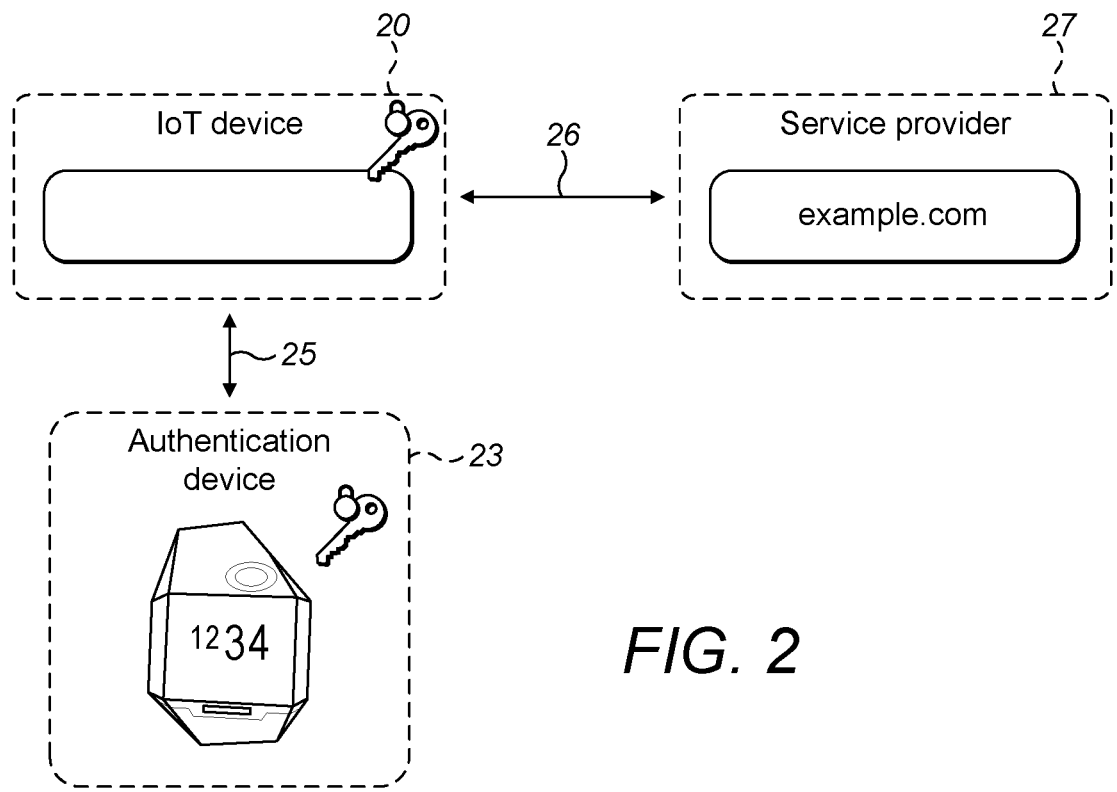
FIG. 2 schematically illustrates an IoT device, an authentication device and a service provider.

FIG. 2 schematically illustrates an IoT device, a service provider and an authentication device. The IoT device does not have a user interface. Therefore, the IoT device utilises the user interface of the authentication device as described in detail below. However, the IoT device is capable of connecting to a network for communication with a service provider.

Figure 7:
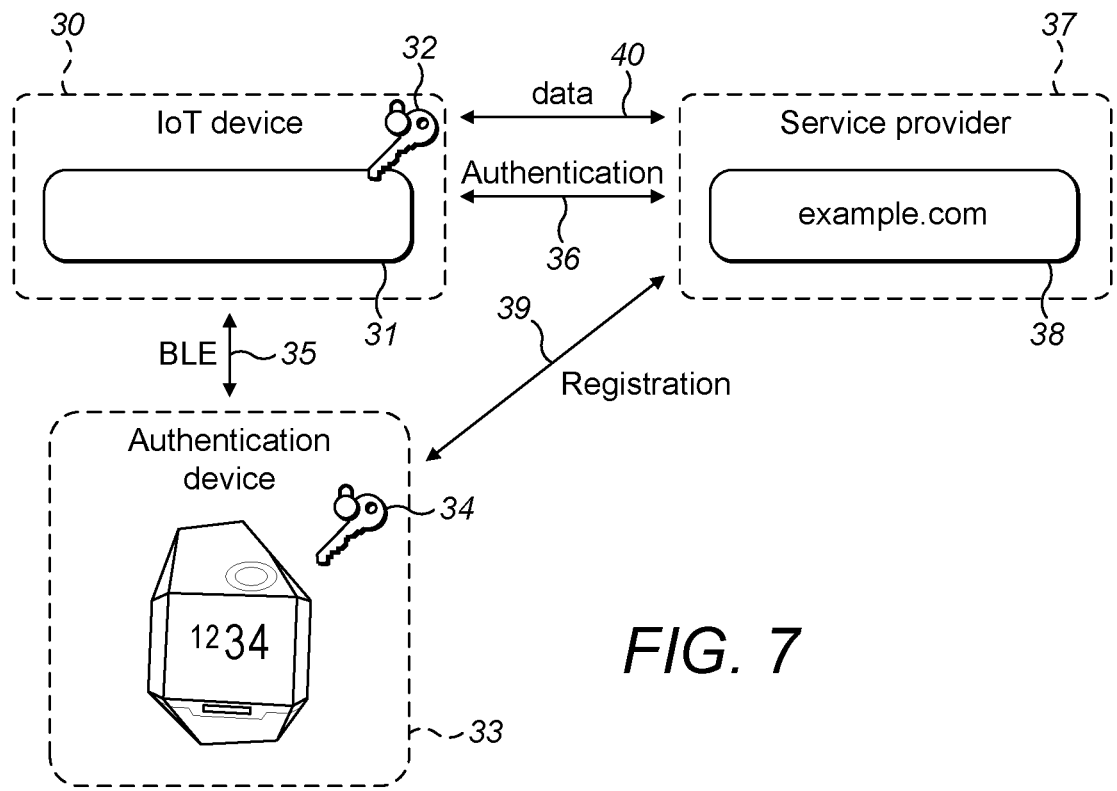
FIG. 7 schematically illustrates an IoT device, an authentication device and a service provider.
Figure 8:
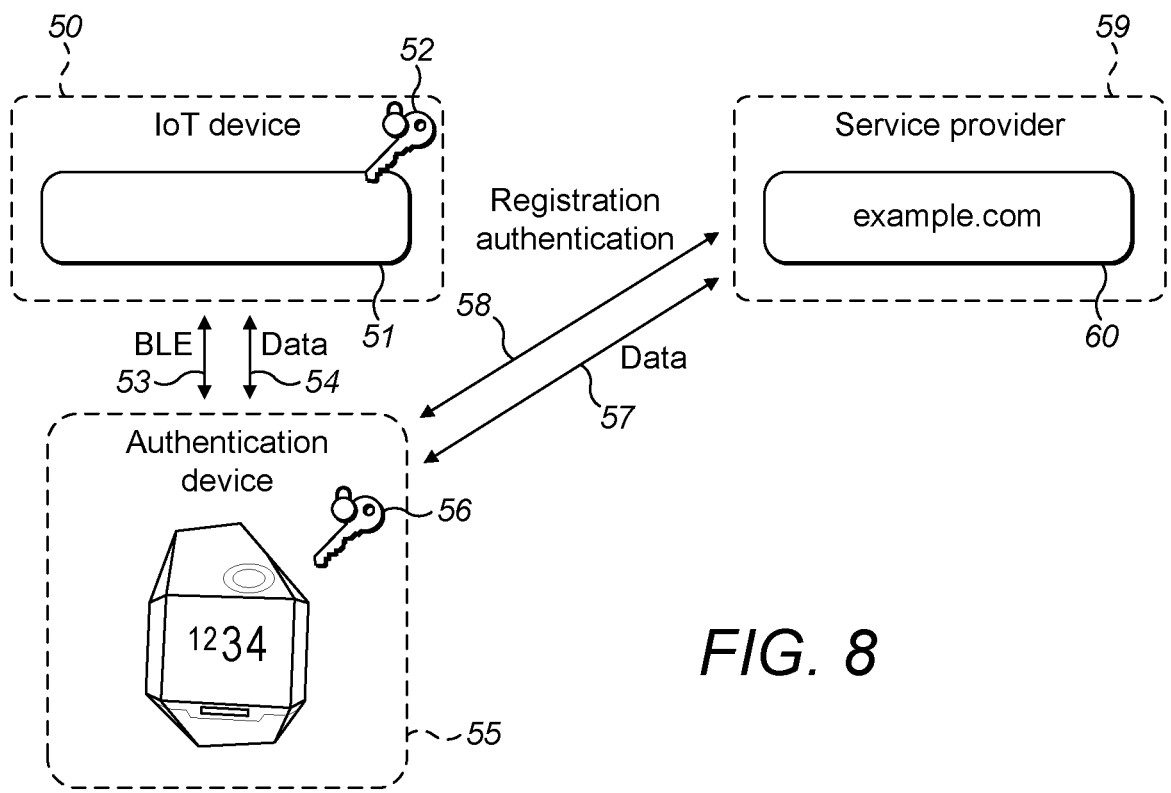
FIG. 8 schematically illustrates an IoT device, an authentication device and a service provider.

In FIGS. 2, 7 and 8, the authentication device 23 is illustrated as a watch having a user interface and authentication capabilities. However, the authentication device is not limited to a watch and may take any form, such as a smart phone, a computer, a gaming device etc.

When the IoT device 20 is unboxed and turned on for the first time, an authentication device 23, in possession of and activated by the user, performs a search (local discovery) to identify the IoT device 20 and pairs with the IoT device 20 using short range communication 25, although different forms of wired or wireless communication may be utilised as discussed above. In one embodiment, an application running on the authentication device 23 performs the search to identify the IoT device 20. In one embodiment, a PIN is entered into the authentication device 23 by the user in order to activate the search for the IoT device.

The authentication device 23 then performs a search to identify available service providers/resources and displays information regarding one or more available service providers/resources on the user interface for selection by the user. In another embodiment, when one or more service providers 27 are known to the authentication device 23, the authentication device displays the service providers information on the user interface for selection by the user. The known service providers information may be displayed together with the identified service providers information or instead of the identified service providers information. In another embodiment, the user can enter the details of a required service provider 27 via the user interface.

In one embodiment, once a service provider 27 has been selected by the user, a secure relationship needs to be established between the IoT device and the service provider. In one embodiment, the IoT device 20 generates a secret data communication channel, in one example a public/private key pair for use with the service provider 27, provides the public key to the service provider 27 and stores the private key at the IoT device 20. The public/private key pair establishes a secure trusted relationship between the IoT device 20 and the service provider 27

The authentication device 23 may also be required to establish a secure trusted relationship between the authentication device 23 and the service provider 27, such that the user of the device does not need to create an account at the service provider 27 using usernames and passwords. However, the authentication device 23 may have already registered with the service provider 27 in an earlier interaction with the service provider 27. For example, the authentication device 23 may have previously associated another/other IoT devices with the service provider 27 or may have registered itself already in context of a regular Web interaction with the service provider 27. In order to establish a secure trusted relationship between the authentication device 23 and the service provider 27, the authentication device 23 generates a public/private key pair for use with the service provider 27, provides the public key to the service provider 27 and stores the private key at the authentication device 23. The use of public key cryptography for the users account ensures that data breaches at the service provider do not lead to a loss of the users credentials (such as it is common with username and passwords).

The user may be required to consent to the establishment of a relationship between the IoT device 20 and the service provider 27 and/or consent to the establishment of a relationship between the authentication device 23 and the service provider 27. User consent is useful for those cases where end users install the IoT devices themselves and want to exert some control over the collection of personal data. In other environments, such as enterprise or industry control environments, the person installing the IoT devices is not necessarily the same entity as those using them and consequently the consent process may be replaced by other forms of consent. The users consent may be obtained via the user interface at the authentication device 23, which offers a display and ensures that the user is provided with enough information to provide informed consent.

In one embodiment, once the user has provided the details of a required service provider 27 to the IoT device via the user interface of the authentication device, then the establishment of a secure relationship between the IoT device and the service provider can take place. In one embodiment, the content of the service provider certificate, provided during a transport layer security (TLS) handshake, is compared with the service provider name selected by the user. This matching process is described in RFC 6125 (https://tools.ietf org/html/rfc6125) and is known to a person skilled in the art.

In one embodiment, the user is required to perform local user verification to the authentication device prior to the establishment of a relationship between the authentication device and the service provider, and prior to the establishment of a relationship between the IoT device and the service provider. In one embodiment, the authentication device includes authentication circuitry, such as a biometric sensor (e.g., a finger print reader), to verify the user, as the owner/allowed user of the authentication device. A user verification step ensures that a user is actually present at the authentication device, it allows local identification of that user at the authentication device (depending on the actually utilized user verification technique), unlocks access to keying material stored at the authentication device, and can be seen as part of the user consent phase that limits or prevents automated attacks, such as phishing. The user verification happens at the authentication device and the biometric material is not uploaded to the service provider.

In some embodiments, a device already having established a relationship with an authentication device may be used to provide the circuitry necessary for enabling user verification (e.g. a biometric sensor). Such a device, already able to communicate with an authentication device may then be able to provide security verification capabilities on behalf of the authentication device. In effect, the device acts as a proxy authentication input device by virtue of already having established a relationship with the authentication device and therefore being trusted. In some embodiments, this may be used if additional authentication is needed over and above approval from the authentication device, in other embodiments it may be used instead of security circuitry on the authentication device. In the latter instance, this may be particularly useful if it is difficult for a person to operate the authentication device directly because of physical difficulties or an ailment (for example) and therefore use of an alternative device that is capable of communication with the authentication device is preferable to that user. In such an instance, the service provider still communicates with the authentication device and therefore a similar series of operations is still perceived from the service provider.

Following authentication of the user and connection with the service provider 27, the authentication device 25 may no longer be required. The IoT device 20 has communication capabilities such that it is able to communicate with, transfer data 26 to and receive data from the service provider 27 directly. However, the authentication device 23 may be required periodically to re-authenticate the IoT device 20, if a specific application domain demands so.

A detailed description for how to register a public key with a service provider/resource by an authentication device can be found at https://fidoalliance.org/specifications/download.

In one embodiment, the secret data communication channel, such as a public/private key pair can be generated at either the IoT device or the authentication device depending on the capabilities of the IoT device. For example, when the IoT device does not have the processing capabilities necessary to generate the secret data communication channel, then the secret data communication channel for the IoT device can be generated at the authentication device.

In order to establish a trusted relationship between an IoT device and a service provider supported by an authentication device, the service provider is chosen with the help of the user (in a discovery step), the public key of the IoT device is registered with the service provider and the IoT device is bound to a specific user.

The aim of the discovery step is to tell the IoT device what service provider it is required to establish a link with. In one embodiment, the user provides information about the service provider via the authentication device to the IoT device. In another embodiment, the IoT device scans the local environment (such as for advertisements from services providers in near proximity) and conveys that information to the authentication device and subsequently to the user. In the latter case the user is able to select a local service provider from a list. The latter case is useful for services that are offered in the local network and can be discovered using either link layer or network layer discovery mechanism.

If the authentication device is already registered with the service provider, then the authentication device does not need to be registered again. The registration of the authentication device with the service provider can happen independently of the registration with the IoT device. If the authentication device is not already registered with the service provider then a registration request is sent by the authentication device to establish a secret data communication channel, such as a public/private key pair with the service provider.

The public/private key pair generated at the authentication device is stored at the authentication device and associated with the service providers identifier. Other data stored on the authentication device includes an attestation certificate and any biometric information if local user verification (such as fingerprint verification) is utilized for user authentication.

In another embodiment, elliptic curve cryptography (ECC) keys in addition to RSA-based keys may be used to speed-up the computational process.

In one embodiment, the authentication device interacts with more than one service provider, consequently a different public/private key pair is created for use with each specific service provider.

Since the authentication device creates the key pairs it is equipped with a secure connection generator, such as a random number generator and with facilities to store keys securely. As such, the manufacturer of the authentication device and other parties never get to know the private key of the authentication device.

The generation of the key pair and the storage requires consent from the user. This consent is accomplished by interacting with the user, i.e., the user pushes a button at the authentication device in order to consent or completes a process of user verification (e.g., the user gives consent using a fingerprint sensor). Following consent being granted, the authentication device may store information about whom the consent was granted with so that it is easier for the user to keep track of actions and to revoke given consent later, if required. Since explicit consent for any actions taken by the service provider is required from the user, the user can later be confident that their data is only sent to parties that have previously been approved by the user.

Figure 3:
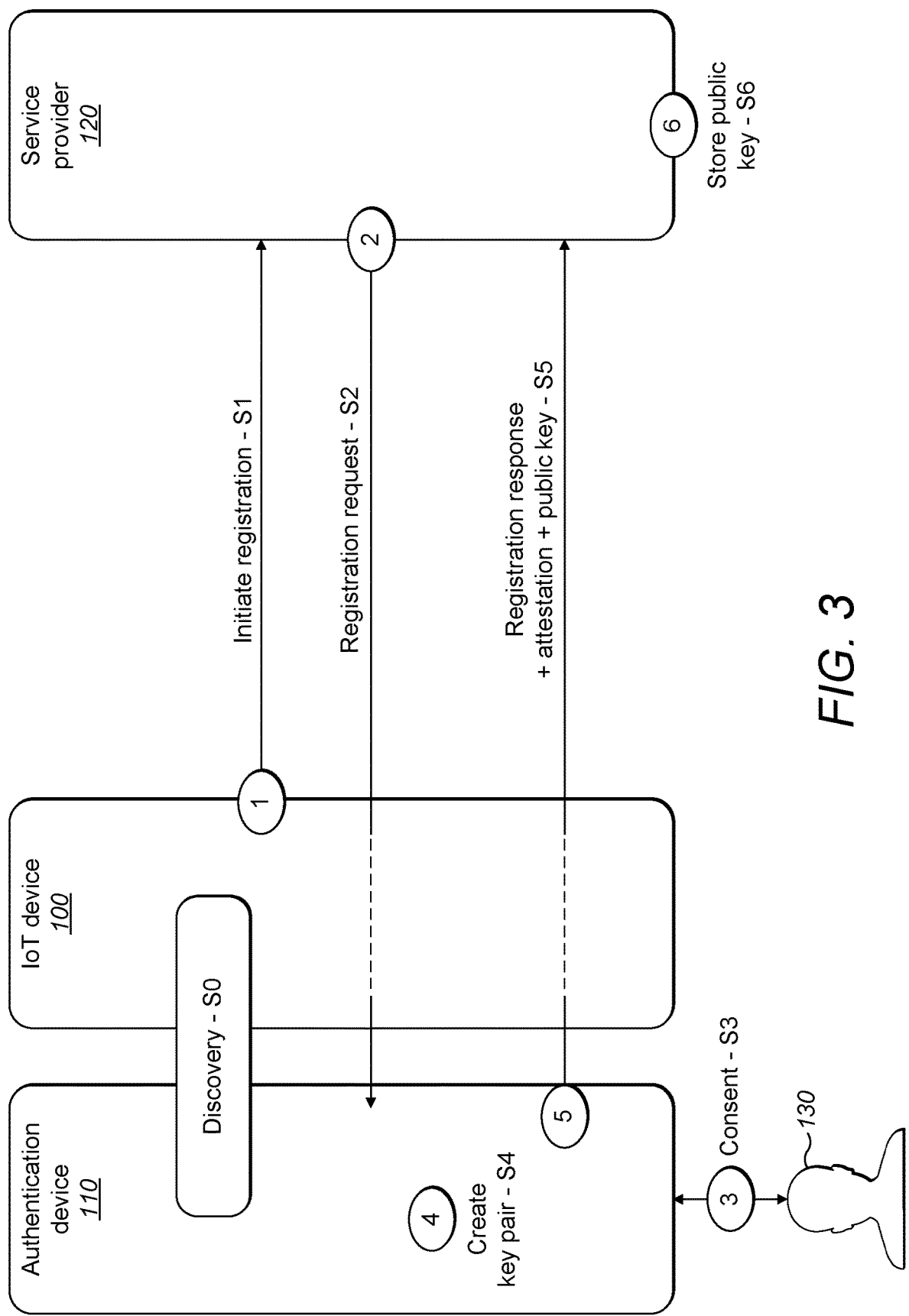
FIG. 3 schematically illustrates message exchanges between an IoT device, an authentication device and a service provider.

If the authentication device has not been registered with the service provider yet then the following steps need to be executed in order to do so, as shown in FIG. 3.

In order to establish a trusted relationship between the authentication device and the service provider, when the authentication device has not yet been registered with the service provider, the authentication device sends the service provider a registration request relayed via the IoT device.

The authentication device can establish a trusted relationship with the service provider directly if an end-to-end communication exchange between the authentication device and the service provider is utilized (for example when DTLS/TLS is used).

In another embodiment, authentication of the service provider by the IoT device allows the IoT device to relay the authenticated identity of the service provider to the authentication device.

The high-level message exchange for registration of the authenticator to the service provider via the IoT device is shown in FIG. 3.

Figure 9:
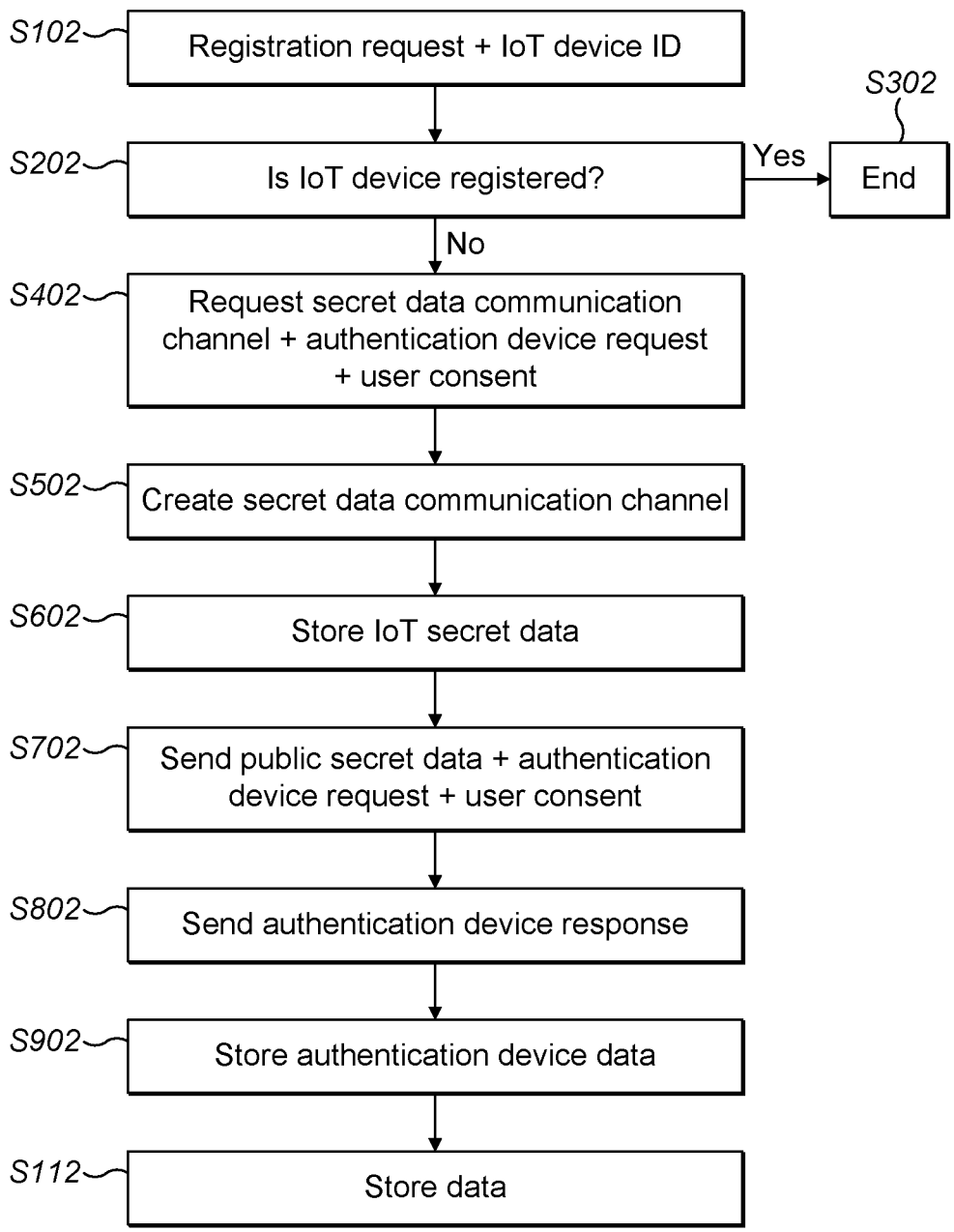
FIG. 9 schematically illustrates a method of establishing a relationship between an IoT device and a service provider.

FIG. 9 schematically illustrates a method of establishing a trusted relationship between an IoT device and a resource/service provider, following selection of the service provider by the user via the authentication device. In order to establish a trusted relationship between the IoT device and the service provider, the IoT device sends the service provider a registration request specifying an identifier of the IoT device, in one example the serial number of the IoT device at step S102. The service provider checks whether the IoT device is already registered with the service provider at step S202. If the IoT device is already registered with the service provider, then the IoT device does not need to be registered again and the method ends at step S302. If the IoT device is not already registered with the service provider then a request is sent to the IoT device to create a secret data communication channel, in one example a new key pair, at step S402, together with an authentication device request. The authentication device is already registered with the service provider, therefore the service provider requests, via an authentication device request message, authentication of the authentication device so that the service provider can confirm its identity. The authentication device request is conveyed via the same message as the secret data communication channel request so that the two interactions, the IoT device authentication and the authentication device authentication, can be cryptographically bound together and thereby create an association between the IoT device and the authentication device of the user. The service provider also requests the users consent for access to the service provider with given permissions at step S402.

In one embodiment, the IoT device is not capable of creating a secret data communication channel, therefore the IoT device sends a request to the authentication device to generate the IoT device key pair.

An IoT device key pair is generated at step S502, and the private key $K_{i,pr}$ of the IoT device key pair is stored at the IoT device in step S602. In one embodiment, the private key $K_{i,pr}$ of the IoT device key pair is stored in a protected storage region of the IoT device. Other data such as the IoT device ID and the IoT device certificate (attestation certificate) may also be stored at the IoT device.

The public key $K_{i,pu}$ of the IoT device key pair, corresponding to the private key $K_{i,pr}$ of the IoT device key pair is sent to the authentication device, together with the authentication device request and the request for the users consent at step S702. The request for consent is sent to the user, via the authentication device. The public key for the IoT device is stored at the authentication device.

In one embodiment, following user consent, the authentication device stores the consent information about the consent the user has granted so that it is easier for the user to keep track of their consents and to revoke consents later, if required. Since explicit consent for any actions taken by the service provider is required from the user, the user can be confident that their data is only sent to parties that have previously been approved by the user.

An authentication response is communicated from the authentication device to the IoT device, which includes the public key of the authentication device and the users consent. The digital signature computed over the authentication response message demonstrates that the authentication device was involved in the communication exchange and the users consent unlocks the private key required for computing this digital signature (see step S802). The IoT device may store the public key of the authentication device at step S902 for later communication with the authentication device. In another embodiment, the authentication properties offered by the underlying link layer security authentication mechanism may be utilised.

Finally, the service provider stores the information about the IoT device, the IoT device public key $K_{i,pu}$, the authentication device public key $K_{a,pu}$ and the users consent at step S112. The IoT device private key $K_{i,pr}$ and the corresponding IoT device public key $K_{i,pu}$ together create a secret data communication channel between the IoT device and the service provider.

In another embodiment, the IoT device can authenticate the service provider using a service provider public key $K_{s,pu}$ transmitted to the IoT device, which corresponds to a service provider private key $K_{s,pr}$ held by the service provider, and which together create a secret data communication channel between the IoT device and the service provider.

In another embodiment, mutual authentication of the IoT device and the service provider can be obtained using asymmetric cryptography, for example the IoT device private key $K_{i,pr}$ together with the corresponding IoT device public key $K_{i,pu}$, and the service provider private key $K_{s,pr}$ together with the corresponding service provider public key $K_{s,pu}$. In the mutual authentication, the IoT device encrypts a hash of a message using the IoT device private key $K_{i,pr}$ and transmits the partially encrypted message to the service provider. In a corresponding way, the service provider encrypts a hash of a message using the service provider private key $K_{s,pr}$ and transmits the partially encrypted message to the IoT device. The IoT device obtains its own hash of the message and compares this with the hash obtained by decrypting the encrypted hash with the service provider public key $K_{s.pu}$. If the two hashes match then the service provider is authenticated. Similarly, the service provider obtains a hash from the IoT device message and compares it with the hash obtained by decrypting the encrypted hash received with the message using the IoT device public key $K_{i.pu}$. Again, if the two hashes match then the IoT device is authenticated.

In one embodiment, the asymmetric cryptography is elliptic curve cryptography (ECC) or RSA cryptography.

The authentication device may also be required to establish a trusted relationship with the service provider. In one embodiment, this would be performed once for each service provider by the authentication device, so that the authentication device is not required to perform the process for each IoT device it connects to the service provider.

FIG. 3 schematically illustrates high-level message exchanges between an IoT device 100, an authentication device 110 and a service provider 120. More specifically, FIG. 3 schematically illustrates high-level message exchanges for registering an authentication device 110 with a service provider 120. Prior to the registration exchanges a discovery phase takes place. During this discovery phase the IoT device learns what service provider to establish a link with. In this example, the IoT device 100 has no user interface so utilises the user interface of the authentication device 110. However, the IoT device 100 is capable of communicating with the service provider 120 directly.

Following activation of the IoT device 100 and the discovery step at step 0 (S0), the IoT device 100 initiates registration at step 1 (S1). A registration request (S2) is received from the service provider 120 and communicated to the authentication device 110 together with a request for consent from the user for access to the service provider 120 with given permissions (asked for by the service provider). The consent is granted in step 3 (S3). The authentication device 110 may store information about the consent the user has granted so that it is easier for the user to keep track of actions and to revoke given consent later, if required.

Since explicit consent for any actions taken by the service provider 120 is required from the user, the user can be confident that their data is only sent to parties that have previously been approved by him or her.

Once the user has given consent, the authentication device 110 creates an ephemeral public/private key pair for use with this specific service provider 120 and stores the private key at the authentication device at step 4 (S4). A registration response is then sent to the service provider at step 5 (S5). The registration response includes the users consent and the created public key pair. Finally, the service provider 120 stores the public key at step 6 (S6). If the authentication device 110 interacts with more than one service provider then it creates a different public/private key pair for use with each specific service provider. As discussed above different forms of wired or wireless communication may be provided between the IoT device 100, authentication device 110 and the service provider 120.

Figure 4:
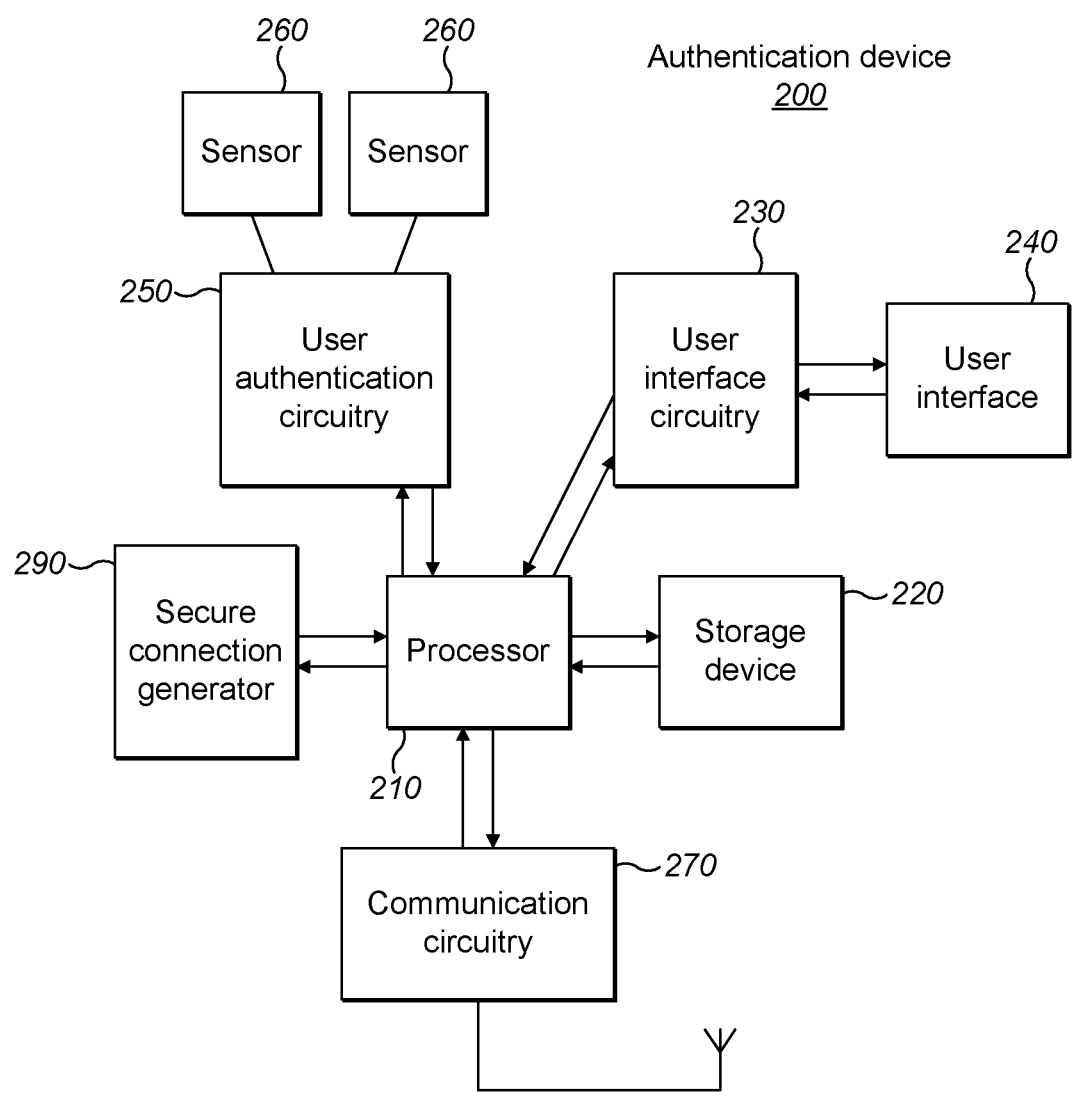
FIG. 4 schematically illustrates an authentication device.

FIG. 4 schematically illustrates an authentication device. The authentication device 200 has a central processor 210, a user interface 240 having user interface circuitry 230, a storage device 220, a secure connection generator 290, user authentication circuitry 250 provided with sensors 260 and communication circuitry 270. In one embodiment, the user interface 240 is a display. However, in another embodiment, the user interface is an audio speaker and microphone. The secure connection generator 290 generates the key pairs and stores the private key in the storage device 220. In one embodiment, the storage device 220 is provided at the secure connection generator 290. In one embodiment, the secure connection generator 290 includes a random number generator. In one example, the user verification circuitry 250 is a finger print scanner provided with sensors 260 for obtaining the users finger print and thus confirming the identity of the user. In one embodiment, the user verification circuitry is not required. Cryptographic features may be provided, such as a secure memory in the storage device 220 and crypto algorithms or secure processing functionality in the secure connection generator 290.

Figure 5:
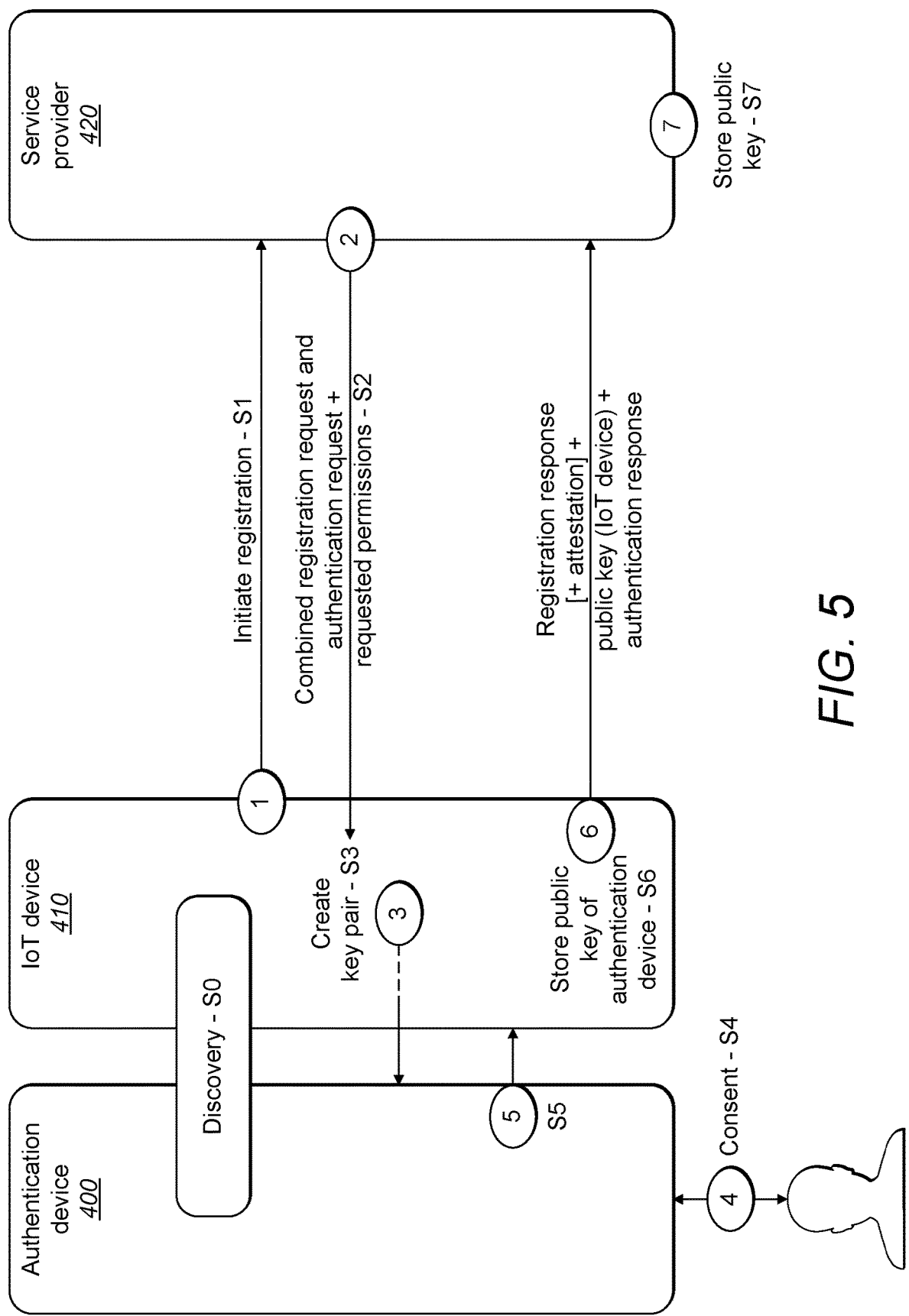
FIG. 5 schematically illustrates message exchanges between an IoT device, a service provider and an authentication device.

FIG. 5 schematically illustrates high-level message exchanges between an IoT device 410, a service provider 420 and an authentication device 400. More specifically, FIG. 5 schematically illustrates high-level message exchanges for registering an IoT device with a service provider and to bind the IoT device to a particular owner, i.e., the user associated with the authentication device. The registering of an IoT device with a service provider happens independently of the registering of the authentication device with the service provider illustrated in FIG. 3.

Prior to the registration exchanges a discovery phase takes place. During this discovery phase the IoT device learns what service provider to establish a link with at step 0 (S0). At step 1 (S1) the IoT device 410 initiates the registration process. At step 2 (S2) the IoT device 410 receives a registration request from the service provider 420 together with an attached authentication request for the authentication device 400. Since the authentication device 400 is already registered with the service provider 420, the service provider 420 requests the public key of the authentication device 400 (via the authentication request) so that the service provider 420 can authenticate the authentication device 400. The authentication request is conveyed together with the registration request since the two interactions, the IoT device registration and the authentication device authentication, need to be cryptographically bound together. While it would be possible to sequence the interactions this approach provides increased performance and lower latency. In addition, at step 2, the service provider 420 requests the user consent to access to the service provider 420 with given permissions.

Upon receiving the registration request from the service provider 420, the IoT device 410 creates an ephemeral public/private key pair, for the IoT device 410 and the specific service provider 420 at step 3 (S3). The IoT device 410 stores the private key. The interaction during the discovery phase gives enough indication from the user that an interaction with that specific service provider is desired even though the user can still decide to cancel the interaction once he or she receives information about the requested permissions asked by the service provider. In addition, the public key is sent to the authentication device 400, together with a request for the users consent to access the service provider 420. The request for consent is sent to the user, via the authentication device 400. The public key for the IoT device 410 is stored at the authentication device 400. The authentication device includes the public key of the IoT device in the digital signature of the authentication response.

Consent is granted in step 4 (S4). In one embodiment, the authentication device 400 stores the consent information the user has granted so that it is easier for the user to keep track of their consents and to revoke consents later, if required.

At step 5 (S5), an authentication response is communicated from the authentication device 400 to the IoT device 410, which includes the public key of the authentication device 400, the users consent and demonstrates that the authentication device 400 was involved in the communication exchange with the user. The consent of the user is implicitly reflected in the fact that the communication exchange continues rather than being aborted. It is, however, also explicitly reflected in the exchange the user needs to unlock the private key stored on the authentication device via the user verification, such as a fingerprint verification or the push of a button. The exact user verification procedure will depend on the hardware and software capability of the authentication device and the desired security level. Once the user unlocked access to the private key this key is then used to compute a digital signature over a number of protocol elements.

At step 6 (S6) the IoT device 410 stores the public key of the authentication device 400. In addition, the IoT device 410 encapsulates the authentication response from the authentication device 400 inside the Registration Response to the service provider 420. Since the authentication response from the authentication device includes a digital signature computed over the public key of the IoT device, the Registration Response is linked to the authentication response via the public key of the IoT device 410. The service provider 420 then stores the public key of the IoT device 410 and binds it to the public key of the authentication device 400 and thereby binds the IoT device to the account established via the authentication device registration.

Figure 6:
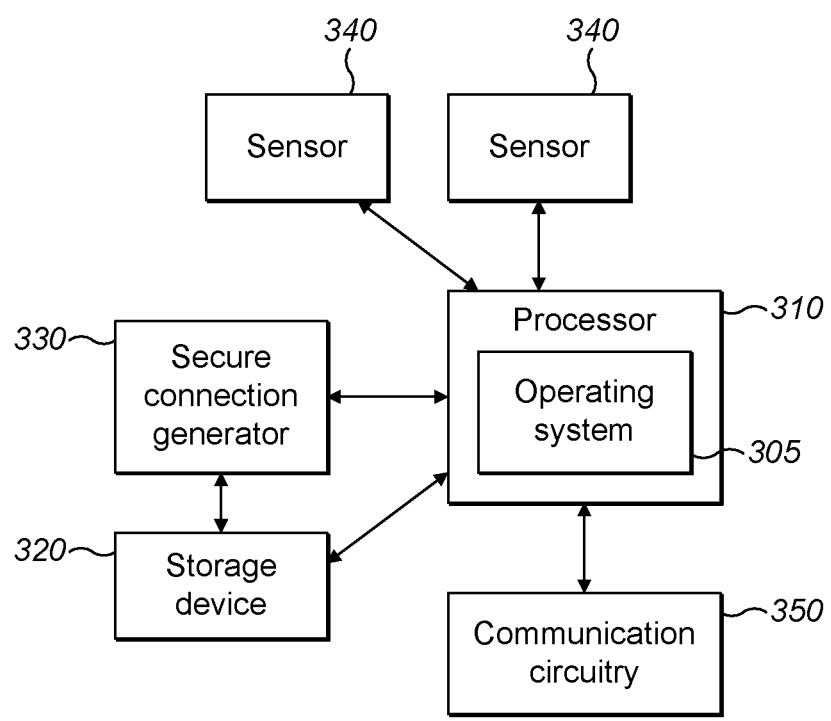
FIG. 6 schematically illustrates an IoT device.

FIG. 6 schematically illustrates an IoT device. The IoT device 300 has a central processor 310 provided with an operating system 305, a storage device 320, a secure connection generator 330, sensors 340 and communication circuitry 350. The secure connection generator 330, in one embodiment a key generator, generates key pairs for the IoT device and stores the private key in the storage device 320 at the IoT device. The sensors 340, may be, for example, a temperature sensor, a humidity sensor, a movement sensor etc. depending on the function of the IoT device. In one embodiment, the storage device 320 is a secure storage device.

Following registration of the IoT device and the authentication device with the service provider:
- the IoT device has established a public/private key pair and associated it with one specific service provider and the IoT device has received the consent from the user, via the authentication device, regarding the permissions solicited by the service provider;
- the service provider has stored the public key of the IoT device, has stored the public key of the authentication device and has associated the IoT device with the authentication device. A single authentication device might be associated with a number of different IoT devices. An IoT device could also be associated with multiple authentication devices in those cases where an IoT device is used by multiple users or where, for backup reasons, multiple authentication devices are used; and
- the authentication device has stored user consent information for each service provider the user has given consent to, has stored the IoT device's public key, and maintains a pairing with the users IoT device(s).

The IoT device then uses a device management/firmware update protocol to obtain application code from the service provider, which is then executed in a sandbox controlled by the operating system of the IoT device to ensure compliance with the permissions granted by the user. An example of such a device management/firmware update mechanism is the Lightweight Machine-to-Machine protocol standardized by the Open Mobile Alliance.

Once these initial interactions are completed the IoT device is fully operational and starts fulfilling its purpose, such as monitoring the temperature of a room, measuring energy consumption, or acting as an actuator. To secure the communication interaction with the service provider and authentication device, the IoT device then uses the previously created key pair, for example, as part of a Transport Layer Security (TLS) or Datagram Transport Layer Security (DTLS) protocol exchange.

In certain situations, the IoT device will not be able to access the service provider initially since it has to go through a network access authentication procedure, which requires credentials to be provisioned to the IoT device. In another embodiment, the IoT device can obtain these credentials if they are already available to the authentication device, which assumes that the IoT device and the authentication device use the same communication technology, for example IEEE 802.11 (Wifi). Credential sharing techniques are dependent on the communication technology used since different communication technologies use different security mechanisms for network access control. Examples of credential sharing technologies are Texas Instruments Smart Config or NFCTab.

IoT devices come with different capabilities and different limitations. In the above description, the IoT device was able to connect to a service provider via a network connection and is able to generate a secret data communication channel with the service provider, for example by generating key pairs. In the following description, an IoT device which is able to connect to a service provider and is able to generate a secret data communication channel is considered a "Category 1" IoT device. Category 1 IoT devices have large processing and memory capabilities. However, other IoT devices that are less sophisticated can also be used.

"Category 2" IoT devices refers to a device that is able to connect to a service provider via a network connection but does not generate the secret data communication channel (for example, the public/private key pair) on the IoT device but rather outsources this functionality to the authentication device. The reasons for this outsourcing may be due to the limited processing and memory capabilities of the IoT device or may be due to regulatory requirements.

"Category 3" IoT devices have limited processing capabilities and non-persistent memory. A category 3 IoT device is not able to connect to a service provider via a network connection and is not able to generate a secure connection.

The following description focuses on "Category 2" IoT devices. FIG. 7 schematically illustrates an IoT device 30, an authentication device 33 and a service provider 37. Category 2 IoT devices are common in highly regulated environments, such as in the financial or healthcare sector, where keying material needs to be exported to a trusted party to allow lawful intercept and similar functionality. Therefore, the generation of a secure connection, for example generating key pairs, is outsourced to a trusted device, i.e., the authentication device 33.

The IoT device 30 can interact with a nearby authentication device 33 using short-range radio technology, such as Bluetooth Smart™, WiFi, Ethernet, IEEE 802.15.4, etc. The authentication device 33 of this embodiment can function as the user interface for the IoT device 30 in order to collect the user's consent and is capable of generating key pairs.

In the following example, the registration of the authentication device 33 with the service provider has already been completed as explained above.

A user buys a category 2 IoT device 30, unboxes it and turns it on. The first step is the pairing of the IoT device and the authentication device. The typical interaction sequence is as follows: the user activates an application provided at the authentication device 33 which initiates a scan of the local area to determine if one (or more) IoT devices 30 are in range. The user can then use the user interface provided at the authentication device 33 to select the IoT device 30 to which the authentication device 33 is to communicate and establish a connection. In one embodiment, a PIN is required to be entered into the authentication device in order to activate scanning.

The next step is the discovery procedure where the service provider the IoT device has to interact with is selected. A possible interaction may be as follows: the authentication device 33 starts a discovery for remote service providers and conveys this information to the user via the user interface provided authentication device 33. The user can then select a service provider 37, from a plurality of service providers 37 detected by the authentication device 30. In another embodiment, the authentication device 33 suggests a particular service provider 37, such that a search for service providers is not required. For example, the authentication device 33 may have already established a connection with a particular service provider 37 when establishing a connection between the service provider 37 and other IoT devices of the user. In another embodiment, the user can enter the details of a required service provider 37 via the user interface provided at the authentication device 33.

Following selection of the service provider, the IoT device 30 contacts the service provider to initiate the registration procedure. In order to do so it needs to establish a Datagram Transport Layer Security (DTLS) or Transport Layer Security (TLS) exchange to authenticate the service provider 37. This allows the IoT device to authenticate the service provider and that it indeed registers with the correct service provider as selected by the user during the discovery step.

In order to register the IoT device with the service provider, the authentication device 33 creates a public/private key pair 34 for the IoT device 30 and the service provider 37 and provides the private key to the IoT device 30 for storage at the IoT device 30, and the public key to the service provider 37, via communication channel 39, for storage at the service provider 37. In one example the authentication device 33 uses Transport Layer Security (TLS) to provide communication security over the Internet and authenticate the IoT device. However, other cryptographic protocols could be used. The authentication device 33 request the users consent to register the IoT device 30 with the service provider 37 and the user provides consent via the authentication device 33. In one example the user may provide consent via a finger print scanner, or may be required to enter password data. The authentication device 33 is used in order to authenticate the IoT device 30 and connect it to the service provider 37 required by the user. Following provision of the authentication and private/public keys to the IoT device 30 and the service provider 37, the authentication device 33 is no longer required. Category 2 IoT devices have communication capabilities and are capable of transferring data 40 to and receiving data 40 from the service provider 37 following establishment of a secure connection. The key pairs generated by the authentication device are used to authenticate 36 the IoT device with the service provider when required. The authentication device 33 may be required periodically to re-authenticate the IoT device 30 with the service provider 37 or whenever the user requires a user interface.

The IoT device can then use the private/public keys to use the FIDO authentication procedure (please see https://fido-alliance.org/specifications/download) to interact with the service provider to demonstrate possession of the private key. This step is optional since the actual data transmission that is used using a security protocol, like DTLS or TLS, will also demonstrate the possession of the private key by the IoT device. However, using this additional FIDO authentication exchange allows potential errors or misconfigurations to be detected immediately and thus ensuring a better user experience. Detecting errors at a later time when the IoT device sends data for the first time might be more difficult to trouble-shoot.

FIG. 8 illustrates a category 3 IoT device 50, a service provider 59 and an authentication device 55. Since category 3 IoT devices have limited processing capabilities and non-persistent memory, are not able to connect to a service provider via a network connection (it does not connect to the network or only has intermittent network connectivity) and is not able to generate a secret data communication channel, for example generate key pairs, the authentication device 55 acts on behalf of the IoT device 50 and the IoT device 50 only transmits data when it is connected with the authentication device 55. In this case, the authentication device 55 is required for IoT device registration and authentication and for data transmission.

An example of a category 3 IoT device is a smoke alarm which is to be connected to a house network (provided by a service provider 59) into which the smoke alarm is to be fitted. The smoke alarm has no user interface and limited processing capabilities. Therefore, when the smoke alarm is "unboxed" and turned on it needs to be discovered in order for it to be connected to the "home" network. In one embodiment, an application is provided at the authentication device 55, which is activated by the user when the IoT device 50 is unboxed. The application performs a search of the local area, identifies the IoT device 50 and creates a temporary connection with the IoT device 50. In one example, the temporary connection may be a short range connection, such as via Bluetooth™.

The authentication device 55 creates a public/private key pair for communications between the authentication device 55 and the IoT device 50, stores the private key and transfers the public key to the IoT device 50. In one example the authentication device 55 uses Transport Layer Security (TLS) to provide communication security over the Internet and authenticate the IoT device 50. However other cryptographic protocols could be used.

The authentication device 55 then starts a discovery for remote service providers 59. The user can then select a service provider 59, from a plurality of service providers 59 detected by the authentication device 55, via the user interface provided on the authentication device 55.

In another embodiment, the authentication device 55 suggests a particular service provider 59, for example, the authentication device 55 may have already established a connection to a particular service provider 59 when establishing a connection between the service provider 59 and other IoT devices of the user. In another embodiment, the user can enter the details of a required service provider 59 via the user interface provided at the authentication device 55.

The authentication device 55 also creates a public/private key pair for communications between the IoT device 50 and the service provider 59. It transfers the private key to the IoT device 50 for storage and transfers the public key to the service provider 59 for storage. In one example the authentication device 55 uses Transport Layer Security (TLS) to provide communication security over the Internet and authenticate the IoT device 50. However other cryptographic protocols could be used.

The authentication device 55 request the users consent to register the IoT device 50 with the service provider 59 and the user provides consent via the authentication device 55. In one embodiment, the user provides consent via a finger print scanner, or enters password data.

The authentication device 55 behaves as a conduit for the transfer of data between the category 3 IoT device 50 and the service provider 59 and is not required to read or understand the data. The IoT device 50 transfers data to the authentication device 55 which uploads the data to the service provider 59. A category 3 IoT device uses an authentication device in order to transfer data to the service provider. Following setup of the IoT device with the service provider the connection between the IoT device, authentication device and the service provider may be terminated and only reinstated periodically for data transfers. These data transfers/updates may be triggered by the IoT device or the application running on the authentication device, or the service provider sending a request to the authentication device.

Therefore, IoT devices which have very limited resources and without Flash can be connected to a service provider securely during a defined session. When the session expires for example, when the authentication device is no longer communicating with the IoT device such that the IoT device cannot communicate with the service provider, the IoT device will not be able to send data to the remote service provider. Therefore, the user of the IoT device has control over when data is transferred to and from the service provider. In one embodiment, the user triggers the connection of the IoT device to the service provider via the authentication device. In another embodiment when the authentication device is moved into close proximity with the IoT device, connection to the service provider is initiated.

In another embodiment, the authentication device provides the URL of the service provider and the keys to the IoT device when in proximity of the IoT device, so that the IoT device is able to interact with the service provider and send data to the service provider only when authorized and triggered by the authentication device.

Firmware and configuration data can be transferred to the IoT device from the service provider either during the initial registration process via the authentication device or during the authentication process directly to the IoT device. The choice will likely depend on the bandwidth available via the communication technology used by the IoT device. A smart phone connected via WiFi or cellular radio is able to download software updates much faster and more reliably than an IoT device connected using a low power radio technology.

Since a category 3 IoT device is not capable of accessing the Internet to contact a service provider, the IoT device cannot register itself with the service provider. As a solution to this problem the IoT device uses a special form of network access authentication procedure embedded within a regular authentication exchange to piggyback the FIDO registration messages. In this case, the protocol exchange is identical to the one shown in FIG. 5 but encapsulated in a different manner. As a proof-of-concept, the FIDO IoT device registration is encapsulated in the network access authentication exchange of a WiFi network or an IEEE 802.15.4 network using the Extensible Authentication Exchange (EAP) framework that allows EAP methods to be used. While a new EAP method has to be defined for this purpose since none of the existing methods support the FIDO protocol exchange existing network using the EAP framework, like IEEE 802.1X or ZigBee-IP, can be upgraded seamlessly.

The above embodiments refer to user authentication being provided via a finger print scanner, or the entering of password data. However, the teachings described in this application are not limited to these methods of user authentication and any method of authenticating the user could be used.

Those skilled in the art will appreciate that while the foregoing has described what is considered to be the best mode and where appropriate other modes of performing the embodiments, the embodiments should not be limited to the specific configurations and methods disclosed in this description. Those skilled in the art will recognise that the teachings have a broad range of applications, and that the embodiments may take a wide range of modifications without departing from the inventive concept as defined in the appended claims.

In one embodiment, a method for registering an agent device with a resource is provided. The method comprising: selecting a resource and initiating registration of the agent device with the resource; generating, at an authentication device, a secret data communication channel between the agent device and the resource; and transferring the secret data communication channel to the agent device.

In another embodiment, the secret data communication channel comprises agent device secret communication data and resource secret communication data and the method further comprises storing the agent device secret communication data at the agent device.

In another embodiment, the method further comprises transferring the resource secret communication data to the resource and storing the resource secret communication data at the resource.

In another embodiment, the agent device transfers the resource secret communication data to the resource.

In another embodiment, the authentication device transfers the resource secret communication data to the resource.

In another embodiment, the method further comprises requesting user consent to the registration of the agent device with the resource.

In another embodiment, the authentication device suggests the resource for registration.

In another embodiment, the agent device suggests the resource for registration.

In another embodiment, the agent device transfers secret data communications for the resource to the authentication device and the authentication device transfers the secret data communications to the resource.

In another embodiment, the resource transfers secret data communications for the agent device to the authentication device and the authentication device transfers the secret data communications to the agent device.

In another embodiment, the method further comprises generating, at the authentication device, a secret data communication channel between the authentication device and the agent device.

In one embodiment, a method for registering an agent device with a resource is provided. The method comprising: selecting a resource and initiating registration of the agent device with the resource; receiving a registration request from the resource together with an authentication request for an authentication device registered with the agent device and a request for user consent; transferring the authentication request and request for user consent to the authentication device; generating a secret data communication channel between the agent device and the resource; storing the secret communication data at the agent device; receiving the authentication device authentication data and user consent at the agent device; sending a registration response to the resource, the registration response including: the agent device secret communication data, the authentication device authentication data and the user consent; and storing the agent device secret communication data together with the authentication device authentication data at the resource.

In one embodiment, a method for registering an authentication device with a resource is provided. The method comprising: selecting a resource and initiating registration of the authentication device with the resource; receiving a registration request from the resource together with a request for user consent; generating a secret data communication channel between the authentication device and the resource; sending a registration response to the resource, the registration response including the users consent and the secret communication data; and storing the secret communication data at the resource.

In one embodiment, a system for managing at least one relationship between an agent device and a resource is provided. The system comprising: an agent device having communication circuitry configured to enable communication with an authentication device; the authentication device comprising: communication circuitry configured to enable communication with the agent device; communication circuitry configured to enable communication with a resource; a user interface capable of conveying information to a user and receiving commands from a user; and a secure connection generator capable of generating a secret data communication channel between the authentication device and the resource.

In another embodiment, the secure connection generator is further capable of generating a secret data communication channel between the agent device and the resource.

In another embodiment, the agent device further comprises an agent device secure connection generator capable of generating a secret data communication channel between the agent device and the resource.

In another embodiment, the agent device further comprises an authentication device detector for detecting one or more authentication devices within range of the agent device communication circuitry configured to enable communication with the authentication device.

In another embodiment, the agent device further comprises a resource detector for detecting one or more resources within range of the agent device communication circuitry configured to enable communication with the resource.

In another embodiment, the authentication device further comprises an agent device detector for detecting one or more agent devices within range of the authentication device communication circuitry configured to enable communication with the agent device.

In another embodiment, the authentication device further comprises a resource detector for detecting one or more resources within range of the authentication device communication circuitry configured to enable communication with the resource.

In another embodiment, the secret data communication channel is created using asymmetric key pairs.

In another embodiment, the secret data is encrypted by the secure connection generator.

In another embodiment, the secret data communication channel is created using elliptic curve cryptography keys.

In another embodiment, the secret data communication channel is an ephemeral public/private key pair.

In another embodiment, the authentication device regenerates the secret data communication channel in order to change the secret communication data.

In another embodiment, the secure connection generator regenerates the secret data communication channel in order to change the secret communication data.

In another embodiment, the communication circuitry is configured to enable communication using wired or wireless communication means.

The invention claimed is:

1. A method for registering an agent device with a remote resource, the method comprising:
    establishing a communication connection between the agent device and an authentication device;
    performing local verification of information received from an interface at the authentication device prior to establishing communication with the remote resource and prior to establishing a relationship between the agent device and the remote resource;
    selecting, at the authentication device, the remote resource and initiating registration of the agent device with the remote resource;
    generating, at the authentication device, a key pair for authenticating the agent device with the remote resource, the key pair including a first key for the agent device and a second key for the remote resource; and
    providing the first key to the agent device for storage at the agent device, and providing the second key to the remote resource for storage at the remote resource, thereby forming a secret data communication channel based on the stored first and second keys between the agent device and the remote resource,
    wherein the method further comprises requesting user consent to the registration of the agent device with the remote resource, after generating the key pair for authenticating the agent device with the remote resource.

2. The method of claim 1, wherein
    the providing the first key to the agent device comprises transferring a private key generated at the authentication device to the agent device; and
    the providing the second key to the remote resource comprises transferring a public key generated at the authentication device to the remote resource.

3. The method of claim 2, further comprising:
    storing the second key at the remote resource.

4. The method of claim 3, wherein the agent device transfers the second key to the remote resource.

5. The method of claim 3, wherein the authentication device transfers the second key to the remote resource.

6. The method of claim 1, wherein the authentication device suggests the remote resource for registration.

7. The method of claim 1, wherein the agent device suggests the remote resource for registration.

8. The method of claim 1, wherein the agent device transfers secret data communications for the remote resource to the authentication device and the authentication device transfers the secret data communications to the remote resource.

9. The method of claim 1, wherein the remote resource transfers secret data communications for the agent device to the authentication device and the authentication device transfers the secret data communications to the agent device.

10. The method of claim 1, further comprising generating, at the authentication device, a secret data communication channel between the authentication device and the agent device.

11. The method of claim 1, further comprising:
following establishment of the secret data communication channel between the agent device and the remote resource, providing remote resource software code from the remote resource to the agent device.

12. The method of claim 2, further comprising:
storing the agent device secret communication data at the agent device.

13. The method of claim 1, further comprising:
requesting user consent to register the agent device with the remote resource via the authentication device.

14. The method of claim 2, wherein the private key and public key are a key pair generated according to elliptic curve cryptography or RSA cryptograph.

15. A method for registering an agent device with a remote resource, the method comprising:
performing local verification of information received from an interface at an authentication device prior to establishing communication with the remote resource and prior to establishing a relationship between the agent device and the remote resource;
selecting, at the authentication device, the remote resource and initiating registration of the agent device with the remote resource;
receiving a registration request from the remote resource together with an authentication request for the authentication device registered with the agent device and a request for user consent;
transferring the authentication request and request for user consent to the authentication device;
generating, at the authentication device, a key pair for authenticating the agent device with the remote resource, the key pair including a first key for the agent device and a second key for the remote resource;
providing the first key to the agent device for storage at the agent device, and providing the second key to the remote resource for storage at the remote resource, thereby forming a secret data communication channel based on the stored first and second keys between the agent device and the remote resource;
receiving the first key, the second key, the authentication device authentication data and user consent at the agent device;
storing first key at the agent device;
sending a registration response to the remote resource, the registration response including: the second key, the authentication device authentication data and the user consent; and
storing the second key together with the authentication device authentication data at the remote resource,
wherein the method further comprises requesting user consent to the registration of the agent device with the remote resource, after generating the key pair for authenticating the agent device with the remote resource.

16. The method of claim 15, further comprising:
providing remote resource software code from the remote resource to the agent device.

17. A system for managing at least one relationship between an agent device and a remote resource, the system comprising:
an agent device having communication circuitry configured to enable communication with an authentication device;
the authentication device comprising:
a verification circuitry configured to perform local verification of information received from an interface prior to establishing communication with the remote resource and prior to establishing a relationship between the agent device and the remote resource;
communication circuitry configured to enable communication with the agent device;
communication circuitry configured to enable communication with the remote resource;
a user interface capable of conveying information to a user and receiving commands from a user; and
a secure connection generator capable of generating a key pair for authenticating the agent device with the remote resource, the key pair including a first key for the agent device and a second key for the remote resource, providing the first key to the agent device for storage at the agent device, and providing the second key to the remote resource for storage at the remote resource, thereby forming a secret data communication channel based on the stored first and second keys between the agent device and the remote resource; and
the remote resource comprising:
communication circuitry configured to enable communication with the authentication device and the agent device and to provide remote resource software code from the remote resource to the agent device,
wherein the method further comprises requesting user consent to the registration of the agent device with the remote resource, after generating the key pair for authenticating the agent device with the remote resource.

18. The system of claim 17, wherein the secure connection generator is further configured to establish a secret data communication channel between the authentication device and the remote resource.

19. The system of claim 17, wherein the agent device further comprises an authentication device detector for detecting one or more authentication devices within range of the agent device communication circuitry configured to enable communication with the authentication device.

20. The system claim 17, wherein the agent device further comprises a remote resource detector for detecting one or more remote resources within range of the agent device communication circuitry configured to enable communication with the remote resource.

21. The system of claim 17, wherein the authentication device further comprises an agent device detector for detecting one or more agent devices within range of the authentication device communication circuitry configured to enable communication with the agent device.

22. The system of claim 17, wherein the authentication device further comprises a remote resource detector for detecting one or more remote resources within range of the authentication device communication circuitry configured to enable communication with the remote resource.

* * * * *